United States Patent
Kolluru et al.

[19]

[11] Patent Number: 6,128,597
[45] Date of Patent: *Oct. 3, 2000

[54] AUDIO DECODER WITH A RECONFIGURABLE DOWNMIXING/ WINDOWING PIPELINE AND METHOD THEREFOR

[75] Inventors: Mahadev S. Kolluru, Santa Clara; Patrick Pak-On Kwok, San Jose; Satish Soman, Cupertino, all of Calif.

[73] Assignee: LSI Logic Corporation, Milpitas, Calif.

[*] Notice: This patent is subject to a terminal disclaimer.

[21] Appl. No.: 09/098,662

[22] Filed: Jun. 17, 1998

Related U.S. Application Data

[63] Continuation-in-part of application No. 08/642,520, May 3, 1996, Pat. No. 5,845,249.

[51] Int. Cl.$^7$ .............................. G10L 19/00; G10L 21/04
[52] U.S. Cl. ........................... 704/500; 704/270; 704/278
[58] Field of Search ..................................... 704/500, 501, 704/502, 503, 270; 382/233, 235

[56] References Cited

U.S. PATENT DOCUMENTS

| | | | |
|---|---|---|---|
| 5,809,245 | 9/1998 | Zenda | 395/200.47 |
| 5,845,249 | 12/1998 | Malladi et al. | 704/270 |
| 5,889,515 | 3/1999 | McDade et al. | 345/302 |
| 5,946,352 | 8/1999 | Rowlands et al. | 375/242 |

*Primary Examiner*—David R. Hudspeth
*Assistant Examiner*—Susan Wieland
*Attorney, Agent, or Firm*—Conlevy, Rose & Tayon

[57] ABSTRACT

An audio decoder is provided with a programmable and re-configurable downmixing process. In one embodiment, the audio decoder includes a control module and a data path. The data path is configured to read, scale, add, and write audio samples to and from various audio channel frame buffers. The control module implements state diagrams which specify various control signals for directing the operations of the data path. The control module implements state diagrams for directing windowing and downmixing operations. The order in which these operations are performed may be reconfigurable, i.e. downmixing may be performed before or after windowing. This reconfigurability advantageously permits the system designer to trade a slight audio quality enhancement for a decreased memory requirement for some speaker configurations. The downmixing operation requires scaling coefficients which are provided by the control module. In one embodiment, the control module implements a standardized set of equations with a minimal number of downmixing coefficients, which advantageously allows the decoder to implement fully programmable downmix modes for both MPEG and Dolby standards while minimizing decoder complexity. The coefficients may be set according to a downmix mode and bitstream-specified parameters, or in another embodiment, the coefficients are set by the user.

8 Claims, 7 Drawing Sheets

AUDIO DECODER WITH A RECONFIGURABLE DOWNMIXING/WINDOWING PIPELINE AND METHOD THEREFOR

RELATED APPLICATIONS

This application is a continuation in part of U.S. patent application Ser. No. 08/642,520 entitled "Microarchitecture of audio core for an MPEG-2 and AC-3 decoder", and filed on May 3, 1996 with inventors Mahadev S. Kolluru and Srinivasa R. Malladi U.S. Pat. No. 5,845,249. This application is further related to U.S. patent application Ser. No. 09/098,653 (P-3622) entitled "Audio decoder with programmable downmixing of MPEG/AC-3 and method therefor" with inventors M. Kolluru, P. Kwok and S. Soman, and is filed concurrently therewith.

BACKGROUND OF THE INVENTION

1. Field of the Invention

This invention relates to the field of audio compression, and in particular to an audio decoder with programmable downmix coefficients and reconfigurable downmix and windowing operations.

2. Description of the Related Art

The digital audio coding used on Compact Discs (16-bit PCM) yields a total range of 96 dB from the loudest sound to the noise floor. This is achieved by taking 16-bit samples 44,100 times per second for each channel, an amount of data often too immense to store or transmit economically, especially when multiple channels are required. As a result, new forms of digital audio coding have been developed to allow the use of lower data rates with a minimum of perceived degradation of sound quality.

Lossy audio compression uses fewer bits to represent each sample, but a trade-off in quality occurs since the fewer the bits used to describe an audio signal, the greater the noise. To minimize the trade-off, compression algorithms take advantage of psychoacoustic phenomena such as auditory masking and the frequency dependence of perceived loudness. Consequently, noise is lowered when no audio signal is present, but effectively masked when strong audio signals are present. Since audio signals can only mask noise that occurs at nearby frequencies, when audio signals are present in only some parts of the audio spectrum some compression algorithms reduce the noise in the other parts of the spectrum.

Typically, the audio spectrum of each channel is divided into narrow frequency bands of different sizes optimized with respect to the frequency selectivity of human hearing. This makes it possible to sharply filter coding noise so that it is forced to stay very close in frequency to the frequency components of the audio signal being coded. By reducing or eliminating coding noise wherever there are no audio signals to mask it, the sound quality of the original signal can be subjectively preserved.

Often, coding bits are allocated among the filter bands as needed by the particular frequency spectrum or dynamic nature of the program. A built-in model of auditory masking may allow the coder to alter its frequency selectivity (as well as time resolution) to make sure that a sufficient number of bits are used to describe the audio signal in each band, thus ensuring noise is fully masked. On a higher level, the audio compression algorithm may also decide how to allocate coding bits among the various channels from a common bit pool. This technique allows channels with greater frequency content to demand more data than sparsely occupied channels, for example, or strong sounds in one channel to provide masking for noise in other channels.

Thus, the algorithms which employ "perceptual subband/transform coding" analyze the spectral components of the audio signal by calculating a transform and apply a psychoacoustic model to estimate the just-noticeable noise-level. In a subsequent quantization and coding stage, the algorithms try to allocate the available number of data bits in a way to meet both the bitrate and masking requirements. Typical 16-bit audio sampling frequencies include 32, 44.1, and 48 kHz. The final bitrate of the bitstream may range from 32 kbps to 448 kbps (kilo-bits per second).

Figure 1:
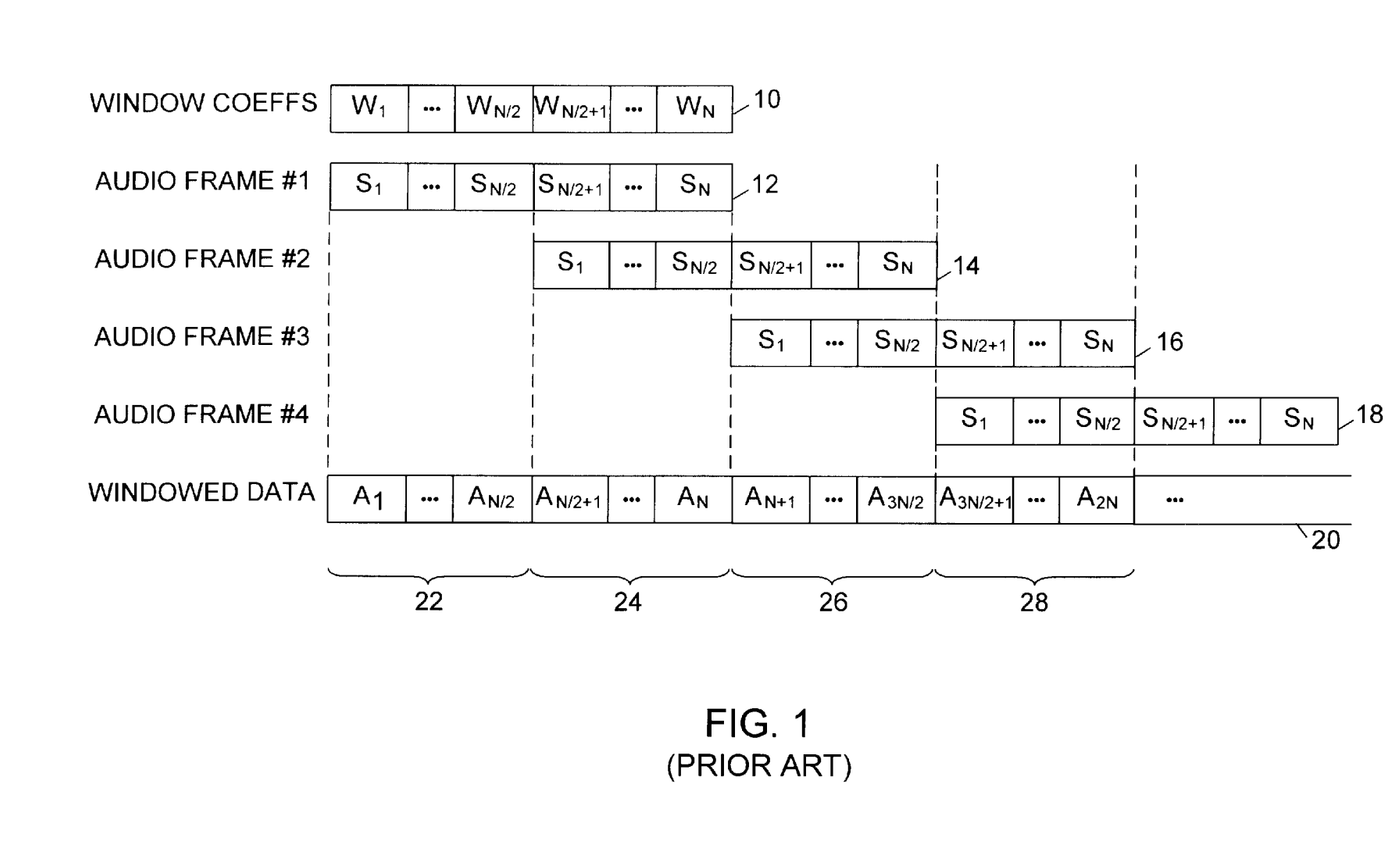
FIG. 1 shows the windowing process.

The audio data in the bitstream is presented in audio frames, where each frame represents audio signal information for a given time interval. For example, an AC-3 audio frame consists of six audio blocks, each audio block containing 256 samples of audio data per channel. Similarly, each MPEG audio frame can be considered to be made of 12 blocks (for MPEG-1) or 36 blocks (for MPEG-2), with each block comprising 32 samples per audio channel. To prevent audio signal discontinuities, each audio block includes audio information which overlaps into the time interval for the next audio block. The audio signals from each audio block are combined together at the overlap, with the contributions from each being scaled so that a smooth transition from one audio block to the next occurs. This technique is referred to as "windowing". FIG. 1 shows a block of windowing coefficients 10 and audio signals from four sequential audio blocks 12, 14, 16, 18. A sequence of windowed audio data 20 is shown divided into four time intervals 22, 24, 26, 28. In the first interval 22, the audio data 20 is generated from the audio signals from the first audio block by multiplying theses signals with appropriate windowing coefficients, i.e. $A_i = W_i S_i$ for $0 < i \leq N/2$. Thereafter, the audio data 20 is found by combining the audio signals from overlapping audio blocks, using the widowing coefficients, i.e. $A_{i+N/2} = W_i S_i|_{current} + W_{i+N/2} S_{i+N/2}|_{previous}$ for interval 24. The weighted averaging of the overlapped audio signals provides for smooth transitions from one audio block to the next.

The components of a typical audio frame are the header, CRC, the audio data and the auxiliary data. The header contains parameters such as sampling frequency and data rate that govern the rest of the frame. The CRC is an error detection code which may be optional and have its presence/absence specified in the header. The audio data consists of the actual compressed sound. The auxiliary data may be a user-defined field. The length of this field may be variable in order to obtain the overall frame length specified by the standard.

Within a single AC-3 or MPEG-2 compliant audio bitstream, up to five compressed audio channels and an uncompressed Low Frequency Effects (LFE) channel may be included. However, fewer channels are commonly employed. MPEG-1 bitstreams have only one or two audio channels, and for backwards compatibility, MPEG-2 bitstreams sometimes employ "downmixing" to get information from the five channels into two channels so that all the audio information is present for MPEG-1 decoders. In this approach, the left audio channel L may include mixed-in center (C) and left-surround (LS) channels, and the right audio channel R may include mixed in center (C) and right-surround (RS) channels. The mixing coefficients and C, LS, and RS are then included in the bitstream so that MPEG-2 decoders can reproduce the five channels individually.

Most audio reproduction systems do not necessarily have the same number of loudspeakers as the number of encoded source audio channels, and consequently audio downmixing is necessary to reproduce the complete effect of all audio channels over systems with different speaker configurations. Both Dolby Labs and ISO/IEC MPEG Audio Standards Committee have published standards specifying sets of downmixing equations for audio decoding to ensure that acceptable quality audio output is reproduced on different speaker configurations.

It is however desirable to produce a single, minimal common set of downmixing equations which may be used to decode audio bitstreams encoded according to Dolby AC-3 and MPEG standards, and which may be further used to reconstruct a fully programmable user-specified number of output audio channels. It is also desirable to provide an audio decoder with reduced memory requirements and reduced computational requirements.

SUMMARY OF THE INVENTION

Accordingly, there is provided herein an audio decoder with a programmable and re-configurable downmixing process. In one embodiment, the audio decoder includes a control module and a data path. The data path is configured to read, scale, add, and write audio samples to and from various audio channel frame buffers. The control module implements state diagrams which specify various control signals for directing the operations of the data path. The control module implements state diagrams for directing windowing and downmixing operations. The order in which these operations are performed may be reconfigurable, i.e. downmixing may be performed before or after windowing. This reconfigurability advantageously permits the system designer to trade a slight audio quality enhancement for a decreased memory requirement for some speaker configurations.

The downmixing operation requires scaling coefficients which are provided by the control module. In one embodiment, the control module implements the following standardized set of equations with a minimal number of downmixing coefficients:

$$\begin{bmatrix} Out2 \\ Out1 \\ Out2 \\ Out3 \\ Out4 \\ Out5 \end{bmatrix} = \begin{bmatrix} a & g & 0 & b & c & h \\ 0 & k & 0 & i & j & h \\ 0 & g & d & e & f & h \\ 0 & 0 & 0 & m & n & 0 \\ 0 & 0 & 0 & 0 & q & 0 \\ 0 & 0 & 0 & 0 & 0 & p \end{bmatrix} \begin{bmatrix} In0 \\ In1 \\ In2 \\ In3 \\ In4 \\ In5 \end{bmatrix}.$$

This advantageously allows the decoder to implement fully programmable downmix modes for both MPEG and Dolby AC-3 standards while minimizing decoder complexity. The coefficients may be set according to a downmix mode and bitstream-specified parameters, or in another embodiment, the coefficients are set by the user.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
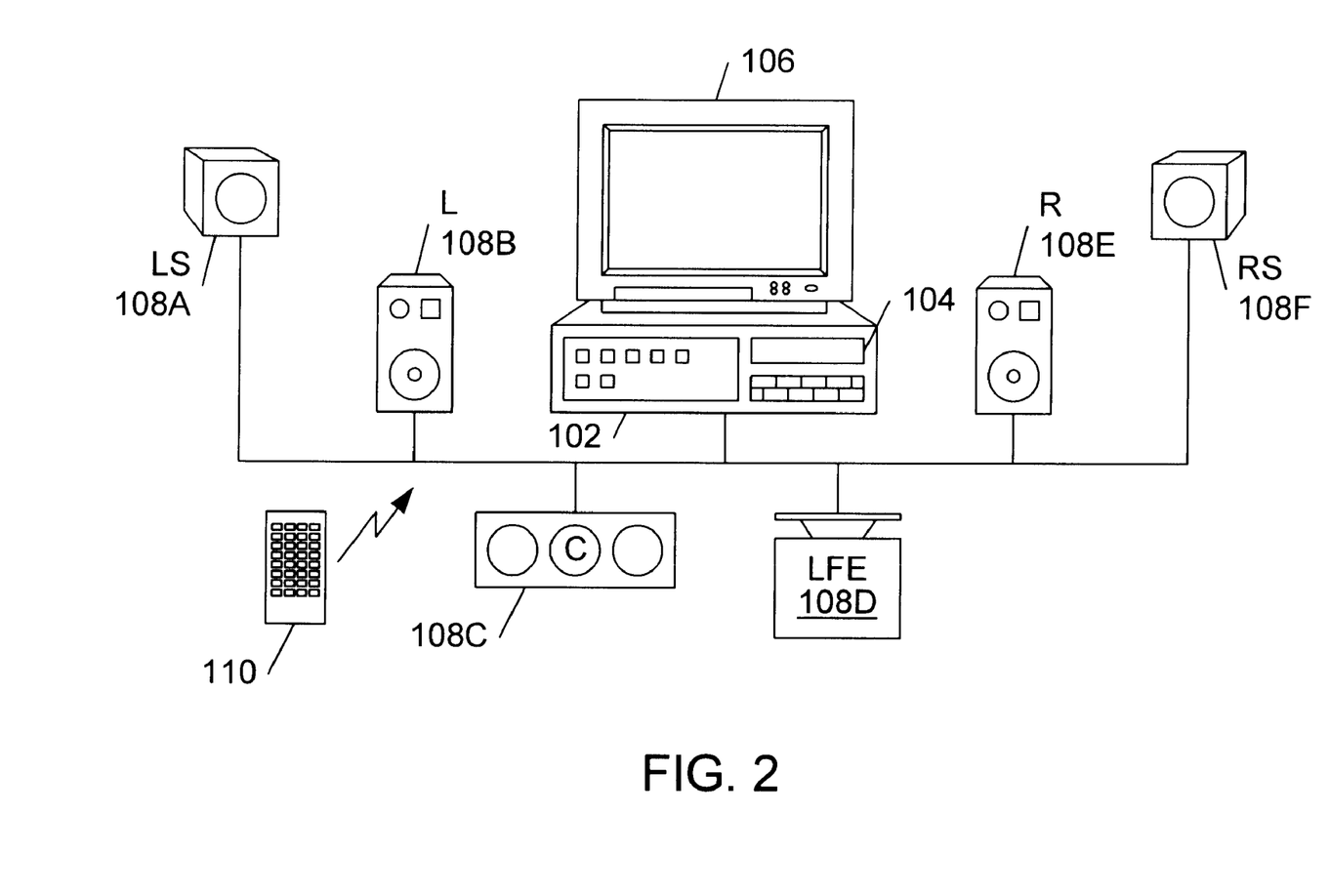
FIG. 2 shows a multimedia system which includes a multi-channel audio subsystem.

Turning now to the figures, FIG. 2 shows a video playback device 102 which includes a multimedia disc drive 104, is coupled to a display monitor 106 and a set of speakers 108, and which may be controlled via a remote control 110. Video playback device 102 includes an audio decoder which advantageously provides programmability of downmix coefficients and which provides for improved audio quality by means of a reconfigurable decoding pipeline. The device 102 accepts multimedia discs in drive 104, and can read compressed multimedia bitstreams from the multimedia disc. The device 102 can convert the multimedia bitstreams into audio and video signals and present the video signal on display monitor 106 and the audio signals on speaker set 108.

Examples of display monitors 106 include: televisions, computer monitors, LCD/LED flat panel displays, and projection systems. The speaker set 108 may exist in various configurations. A single center speaker 108C may be provided. Alternatively, a pair of left and right speakers 108B, 108E may be provided and used alone or in conjunction with a center speaker 108C. Four speakers, 108B, 108C, 108E, 108A may be provided in a left, center, right, surround configuration, or five speakers 108A, 108B, 108C, 108E, 108F may be provided in a left surround, left, center, right, right surround configuration. Additionally, a low-frequency speaker 108D may be provided in conjunction with any of the above configurations.

In one embodiment, multimedia drive 104 is configured to accept a variety of optically readable disks. For example, audio compact disks, CD-ROMs, DVD disks, and DVD-RAM disks may be accepted. The drive 104 can consequently read audio programs and multimedia bitstreams. The drive 104 may also be configured to write multimedia bitstreams, and may additionally be configured to write audio programs. The drive 104 includes a multimedia decoder which converts read multimedia bitstreams into video displays and audio programs. The drive 104 may also include a multimedia encoder for converting video displays and audio programs into a multimedia bitstream. A user can instruct the device 102 to forward receive video displays and audio programs directly to the display monitor 106 and speaker set 108 for display and audio playback.

Figure 3:
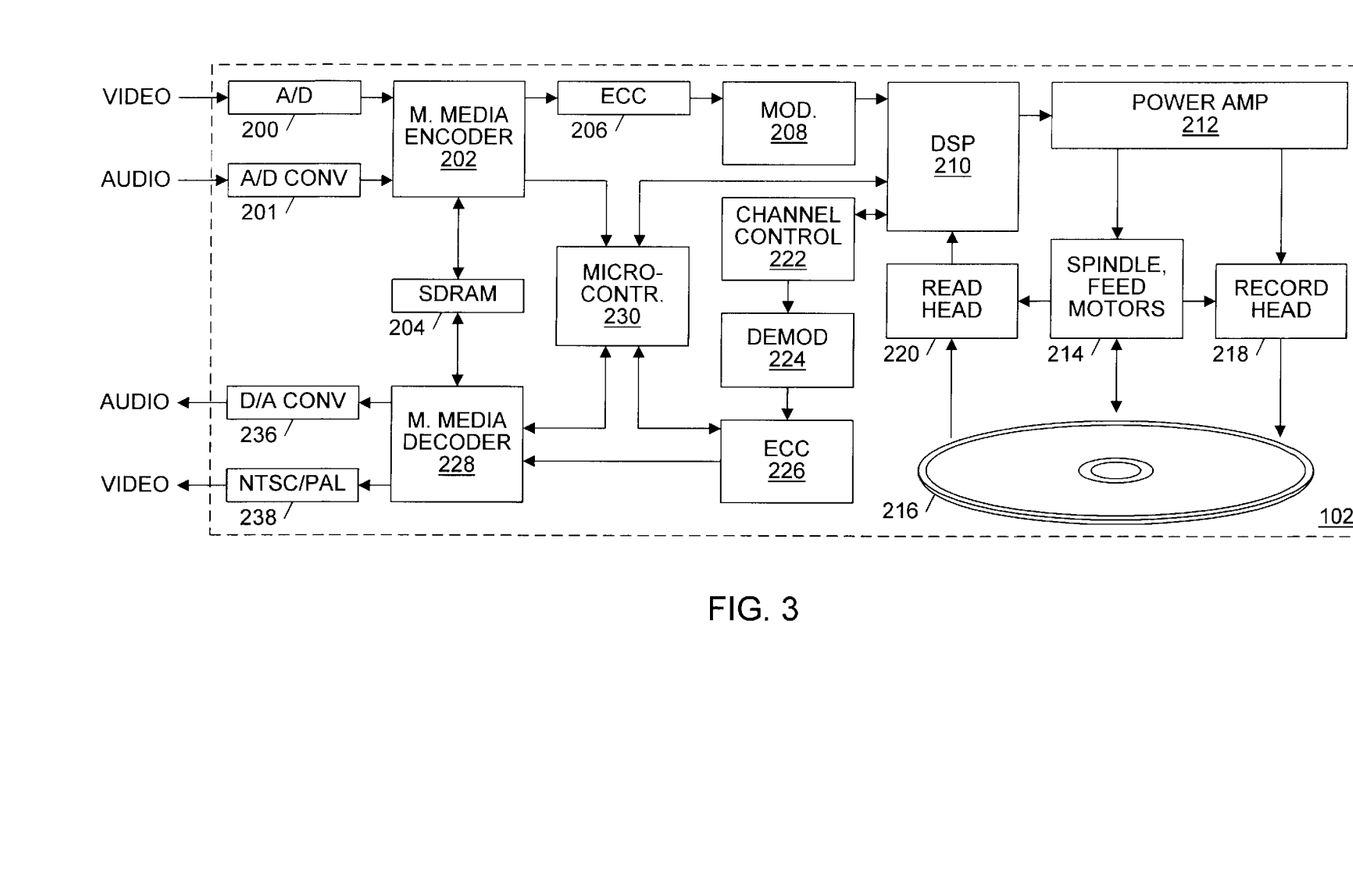
FIG. 3 shows a functional block diagram of a multimedia recording and playback device.

Turning now to FIG. 3, a functional block diagram of one embodiment of a video playback device 102 is shown. The device 102 provides audio and video signals to the display monitor 106, and can accept audio and video signals from a television tuner or some other source. The received video and audio signals are converted to digital video and audio signals by A/D converters 200, 201. The digital audio and video bitstreams are provided to multimedia encoder 202. Multimedia encoder 202 uses synchronous dynamic random access memory (SDRAM) 204 as a frame store buffer while encoding the received signals. The resulting multimedia bitstream is processed by an error correction encoder 206 then converted to a modulated digital signal by modulator 208. The modulated digital signal is coupled to a digital signal processor (DSP) 210 and from there to a power amplifier 212. Amplified signals are coupled to drive motors 214 to spin a recordable multimedia disk 216, and to a record head 218 to store the modulated digital signal on the recordable multimedia disk 216.

Stored data can be read from the recordable multimedia disk 216 by read head 220 which sends a read signal to DSP 210 for filtering. The filtered signal is coupled to channel control buffer 222 for rate control, then demodulated by demodulator 224. An error correction code decoder 226 converts the demodulated signal into a multimedia bitstream which is then decoded by multimedia decoder 228. In decoding the multimedia bitstream, the multimedia decoder 228 produces digital audio and video bitstreams which are provided to D/A converters 236 and 238, which in turn provide the audio and video signals to display monitor 106. Video D/A 238 is typically an NTSC/PAL rasterizer for television, but may also be a RAMDAC for other types of video screens.

Multimedia encoder 202 operates to provide compression of the digital audio and video signals. The digital signals are compressed individually to form bitstreams which are then divided into packets which are inter-mixed to form the compressed multimedia bitstream. Various compression schemes may be used, including MPEG and Dolby AC-3.

In one embodiment, the general nature of the video compression performed by multimedia encoder 202 is MPEG encoding. The video compression may include sub-sampling of the luminance and chrominance signals, conversion to a different resolution, determination of frame compression types, compression of the frames, and re-ordering of the frame sequence. The frame compression may be intraframe compression or interframe compression. The intraframe compression is performed using a block discrete cosine transform with zig-zag reordering of transform coefficients followed by run length and Huffman encoding of the transform coefficients. The interframe compression is performed by additionally using motion estimation, predictive coding, and coefficient quantization.

Audio encoders can be of varying levels of sophistication. More sophisticated encoders may offer superior audio performance and may make operation at lower bitrates acceptable. In one embodiment, the general nature of the audio compression performed by multimedia encoder 202 is MPEG-2/AC-3 encoding. In the MPEG and AC-3 standards, only a basic framework of the audio encoding process is defined, and each encoding implementation can have its own algorithmic optimizations.

AC-3 audio encoding involves the steps of locking the input sampling rate to the output bit rate (so that each audio synchronization frame contains 1536 audio samples), sample rate conversion (if needed), input filtering (for removal of DC components), transient detection, forward transforming (includes windowing and time-to-frequency domain transformation), channel coupling, rematrixing, exponent extraction, dithering strategy, encoding of exponents, mantissa normalization, bit allocation, quantization of mantissas, and packing of AC-3 audio frames. Similarly, MPEG audio encoding involves the steps of filter bank synthesis (includes windowing, matrixing, and time-to-frequency domain mapping), calculation of signal to noise ratio, bit or noise allocation for audio samples, scale factor calculation, sample quantization, and formatting of the output bitstream. For either method, the audio compression may further include subsampling of low frequency signals, adaptation of frequency selectivity, and error correction coding.

Error correction encoder 206 and modulator 208 operate to provide channel coding and modulation for the output of the multimedia encoder 202. Error correction encoder 206 may be a Reed-Solomon block code encoder, which provides protection against errors in the read signal. The modulator 208 converts the error correction coded output into a modulated signal suitable for recording on multimedia disk 216.

DSP 210 serves multiple functions. It provides filtering operations for write and read signals, and it acts as a controller for the read/write components of the system. The modulated signal provided by modulator 208 provides an "ideal" which the read signal should approximate. In order to most closely approximate this ideal, certain nonlinear characteristics of the recording process must often be compensated. The DSP 210 may accomplish this compensation by pre-processing the modulated signal and/or post-processing the read signal. The DSP 210 controls the drive motors 214 and the record head 218 via the power amplifier 212 to record the modulated signal on the multimedia disk 216. The DSP 210 also controls the drive motors 214 and uses the read head 220 to scan the multimedia disk 216 and produce a read signal.

The channel control buffer 222 provides buffering of the read signal, while demodulator 224 demodulates the read signal and error correction code decoder 226 decodes the demodulated signal. After decoding the demodulated signal, the error correction decoder 226 forwards the decoded signal to multimedia decoder 228.

Multimedia decoder 228 operates to decode the output of the error correction decoder 226 to produce digital audio signals and video signals. The operation and structure of multimedia decoder 228 are discussed further below. The digital audio signal and video signals may be converted to analog audio and video signals before being sent to display monitor 106.

Figures 4, 5:
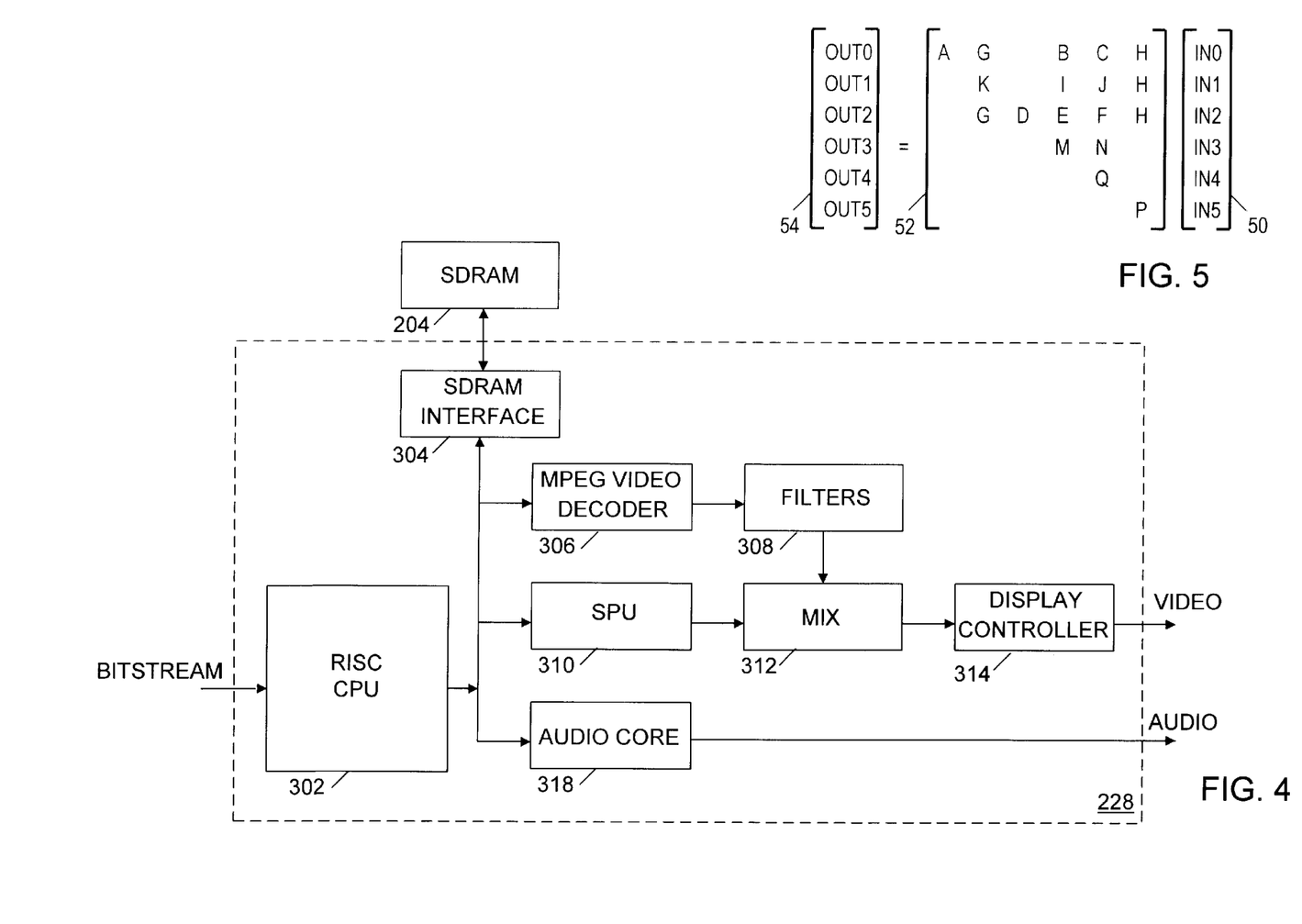
FIG. 4 shows a block diagram of a multimedia bitstream decoder.
FIG. 5 shows a standardized set of downmixing equations.

Turning now to FIG. 4, a block diagram of one embodiment of multimedia decoder 228 is shown. Multimedia decoder 228 receives an encoded multimedia bitstream. The encoded multimedia bitstream is provided to a microcontroller 302 which executes software to parse the bitstream syntax and perform elementary operations such as extracting the bit allocation and scaling information from the headers, and applying that information to convert the variable-length encoded data into fixed-length transform coefficients for the hardware to process. The microcontroller (CPU) 302 then routes the transform coefficients to an appropriate buffer in memory 204 for further processing. In one embodiment, the memory 204 is a synchronous dynamic random access memory (SDRAM) which is accessed via a SDRAM interface 304. Data routed to the audio buffer is decoded by audio decoder 318 and sent to audio D/A converter 236. Data routed to the video decoder buffer is decoded by video decoder 306 and the decoded image data may be filtered by filters 308. Data routed to the sub-picture unit buffer is decoded by sub-picture unit 310 (SPU). The decoded SPU signal may be masked onto the filtered image by mixer 312, and subsequently routed to display controller 314. The display controller 314 synchronizes the transfer of pixel data to rasterizer 238 for display on monitor 106.

In addition to decompressing the audio data, audio decoder 318 operates to downmix the audio channels so that the number of output audio channels is appropriate for the available speaker configuration. Since the speaker configuration may vary (e.g. due to the purchase of new speakers or the failures of old ones) it is desirable to provide for the programmability of downmixing coefficients.

FIG. 5 shows a matrix representation of the downmixing operation. A set of input channels 50 is combined according to a set of downmixing coefficients 52 to produce a set of output channels 54. Coefficients for certain downmixing configurations (e.g. 5-to-2) may be included in the bitstream, and may be used as default values by audio decoder 318. However, unusual speaker configurations are not specifically provided for.

A full six-channel to six-channel mixer would require thirty-six coefficients 52. However, there is provided herein a standardized set of downmix equations which require only 15 coefficients for full flexibility. These are the coefficients "a"–"k","m","n","p", and "q" provided in matrix 52. The empty spaces in matrix 52 are presumed to be zero. Examples of the use of this set of equations are provided in copending U.S. patent application Ser. No. 09/098,653 (P-3622) entitled "Audio decoder with programmable downmixing of MPEG/AC-3 and method therefor".

Windowing and downmixing are the final two operations in the audio decoding process. Since these operations are both essentially linear, they may in theory be re-ordered without affecting the final result. Where the number of output channels is less than the number of encoded source channels, a reduction in memory requirements and required number of computations may be realized by performing downmixing before windowing. However, the fixed length representation of audio samples may introduce some rounding error in the final result when downmixing is performed first.

Figure 6A:
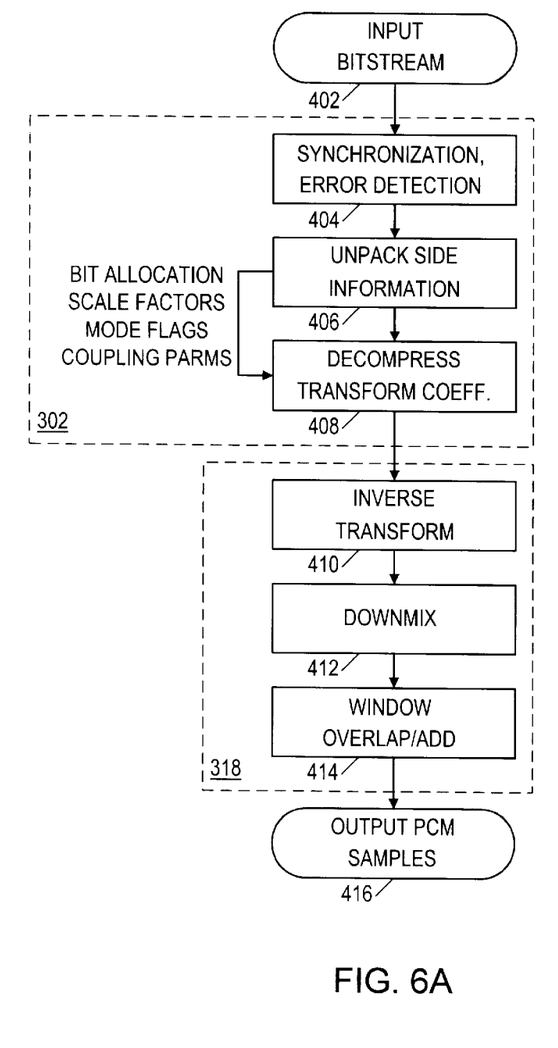
FIG. 6 shows a flowchart of the audio decoding process.

Turning now to FIG. 6A, a flowchart of the audio decompression process is shown. In one embodiment, the audio decoder assumes the availability of a dedicated processor CPU 302 for the audio subsystem. Hence a portion of the available processor bandwidth may be utilized to allow some of the less complex audio decoding tasks to be performed by the CPU. The different tasks in the audio decoding algorithms can be analyzed to determine their complexity, and based on such an analysis, the computationally intensive and repetitive tasks of inverse transform (subband synthesis), downmixing, and windowing may be allocated to dedicated hardware 318. The remaining decoding tasks may be allocated to CPU 302 (shown in FIG. 4). An input bitstream 402 is provided to CPU 302, which parses the bitstream. In step 404, CPU 302 identifies the audio frames, finds the headers and CRC blocks, and performs error detection. In step 406 CPU 302 extracts the side information such as bit allocation, scaling factors, mode flags, cross-coupling parameters, and so on. In step 408, CPU 302 applies the side information to the compressed audio data to convert the audio data into fixed-length transform coefficients. These coefficients are provided to audio decoder 318.

Figure 6B:
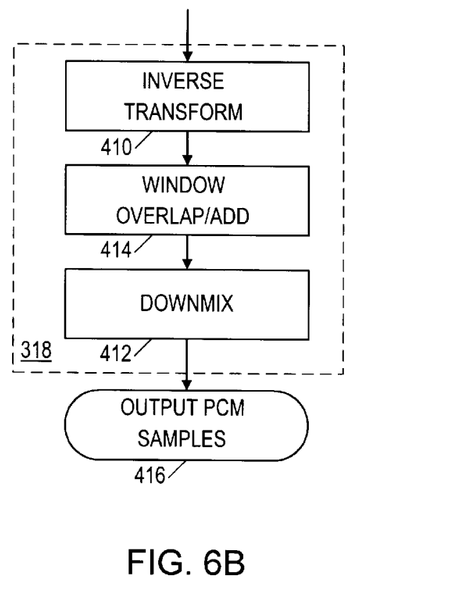

Audio decoder 318 is reconfigurable. A first configuration is shown in FIG. 6A, and a second configuration is shown in FIG. 6B. In FIG. 6A, audio decoder performs an inverse transform in step 410 to produce a set of decompressed audio samples. Depending on the compression algorithm, the inverse transform may be an IFFT (Inverse Fast Fourier Transform), e.g. for Dolby AC-3, or an IDCT (Inverse Discrete Cosine Transform), e.g. for MPEG. In step 412, the audio decoder downmixes the audio samples from different channels, and in step 414, the audio decoder 318 windows the audio data from each downmixed channel to remove discontinuities. Downmixing and windowing are discussed further below.

In FIG. 6B, the audio decoder similarly performs steps 410, 412, and 414, but in a different order so that the audio samples from each channel are windowed before being downmixed. For most speaker configurations, this configuration will require more memory, but will also yield better-quality audio signals.

Figure 7:
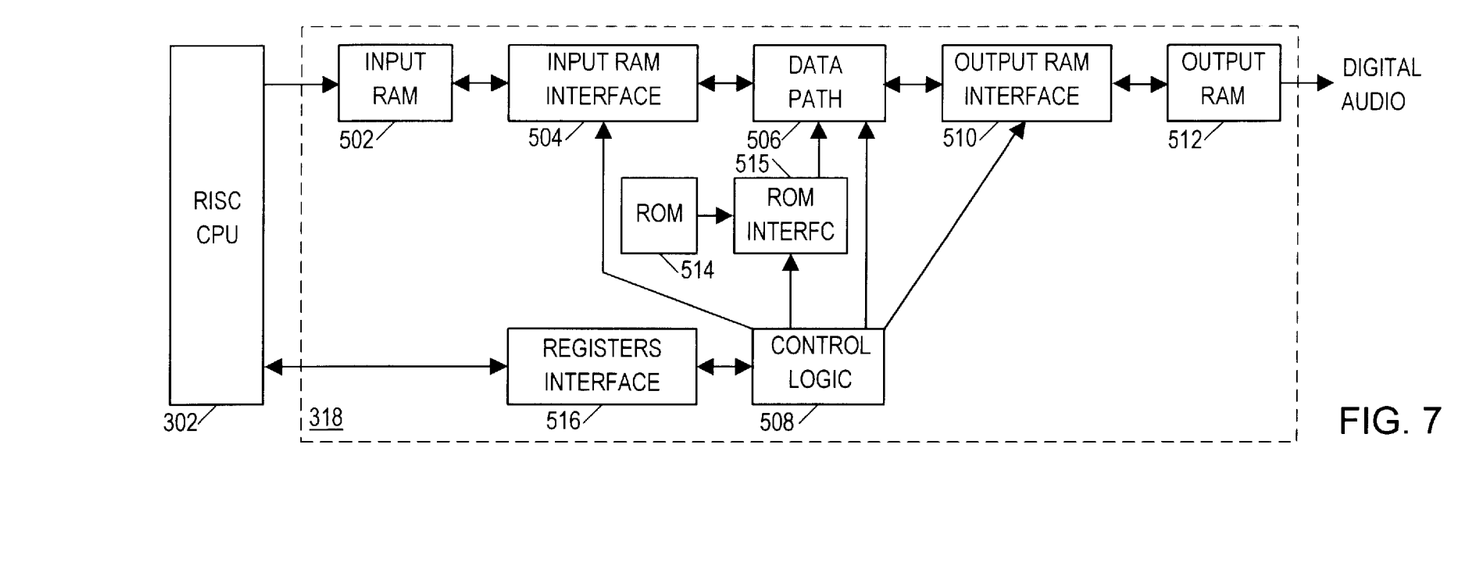
FIG. 7 shows a block diagram of an audio decoder.

FIG. 7 shows a functional block diagram of one embodiment of audio decoder 318. Audio decoder 318 comprises input memory 502, input memory interface 504, data path 506, control logic 508, output buffer interface 510, output buffer 512, coefficient memory 514, memory interface 515, and registers interface 516. The decompressed transform coefficients are written to an input buffer in input memory 502 by CPU 302. The transform coefficients are retrieved from input memory 502 via input memory interface 504 by data path 506 under the control of control logic 508. The transform coefficients are provided in blocks, each block representing the audio samples of one audio channel in one audio frame. Under control of control logic 508, the data path 506 operates on the transform coefficients to transform, window, and downmix data to produce the desired audio output. Intermediate results may be written to input memory 502 via input memory interface 504 and to output memory 512 via output memory interface 510. The final results are written to output memory 512. Control logic 508 operates according to control registers in control logic 508. Control logic 508 uses coefficients stored in coefficient memory 514 to perform the inverse transformation, and subsequently changes mode to perform the windowing and downmix operations. The coefficients are retrieved from memory 514 and provided to data path 506 by memory interface 515 under control of control logic 508. Mode control bits and downmix coefficients are provided to control registers in control logic 508 by CPU 302 via registers interface 516.

In one embodiment, audio decoder 318 is configured to perform AC-3 audio bitstream decoding. Under control of control logic 508, data path 506 performs inverse transform operations and writes the resulting audio samples back to a buffer in the input memory 502. After the inverse transform is complete, the audio samples are again retrieved. At this point, if windowing is performed before downmixing, the first half of the audio samples are combined (windowed) with delayed audio samples and written to a corresponding channel buffer in output memory 512 via output memory interface 510, and the second half of the audio samples are stored as delay samples in a corresponding channel buffer in input memory 502. The inverse transform and windowing is repeated for each of the audio channels in the audio frame.

To perform the downmixing, audio samples from each channel buffer in the output memory 512 are retrieved, combined according to the downmix coefficients, and written back to output memory 512. The memory requirements for this strategy may be summarized as:

input memory size=input buffer size+scratch buffer size+ max no. source channels*(½ input buffer size)

output memory size=max no. source channels * (input buffer size)

If downmixing is performed before windowing, the downmix coefficients are used to determine the contribution of the input sample to each output channel. Previous contributions are retrieved from output channel buffers in output memory 512, added to the current contribution, and written back to the output channel buffers. After the samples from all audio channels of the audio frame have been transformed and downmixed, the data path retrieves the samples from the output channel buffers, and combines (windows) the first half of the samples with delayed audio samples, and writes the results back to the output channel buffers. The second half of the samples are stored as delayed samples in corresponding channel buffers in the input memory 502. The memory requirements for this strategy may be summarized as:

input memory size=input buffer size+scratch buffer size+ number output channels*(½ input buffer size)

output memory size=number output channels * input buffer size

The maximum number of source channels is six, so when the number of output channels is less than four, downmixing before windowing results in a smaller memory requirement. However, downmixing before windowing involves scaling and adding audio samples from different channels together before they have been set at their proper amplitudes by the windowing process. Due to the fixed-length representation of the audio samples, this results in some loss of accuracy in the final audio signals. The error introduced may affect the result in 1–3 of the least significant bits, a level which may be acceptable for many inexpensive, reduced quality audio reproduction/playback systems.

In another embodiment, audio decoder 318 is configured to perform MPEG-2 audio decoding. Under control of control logic 508, data path 506 similarly performs inverse transform operations, and downmixing after windowing or downmixing before windowing operations. For windowing, the MPEG-2 standard uses 512 element "sliding window" vectors for iteratively calculating 32 windowed samples at a time rather than the halfway-overlapping data blocks specified in the AC-3 standard. Each 512 element vector comprises 16 blocks of 32 samples. For downmixing after windowing, each source channel has a corresponding sliding window vector buffer in input memory 502 where inverse-transformed audio samples are stored. Each new block of 32 samples for the source channel is used to replace the oldest block in the vector, so that the sliding window vector consists of the 16 most recent blocks of audio samples for the associated source channel. After each update of the sliding window vector, 32 windowed samples are calculated by combining samples from each of the 16 blocks. The first windowed sample is a weighted sum of the first samples from each of the blocks, the second windowed sample is a weighted sum of the second samples from each of the blocks, and so on. For downmixing, the contribution of the windowed sample to each of the output channels is calculated and added to the partial sum in the output channel buffer.

For downmixing before windowing, each output channel has a corresponding sliding window vector buffer in input memory 502 where downmixed samples are stored. The contribution of each new block of 32 samples to each of the output channels is calculated and added to the corresponding partial sum being accumulated in place of the oldest block of the corresponding sliding window vector. Once the downmixing is complete, the sliding window vectors consist of the 16 most recent blocks of downmixed samples for the associated output channels. For windowing, the 16 blocks of each vector are combined in a weighted sum to form a windowed block of 32 samples which are then written to the appropriate output buffer.

Figure 8:
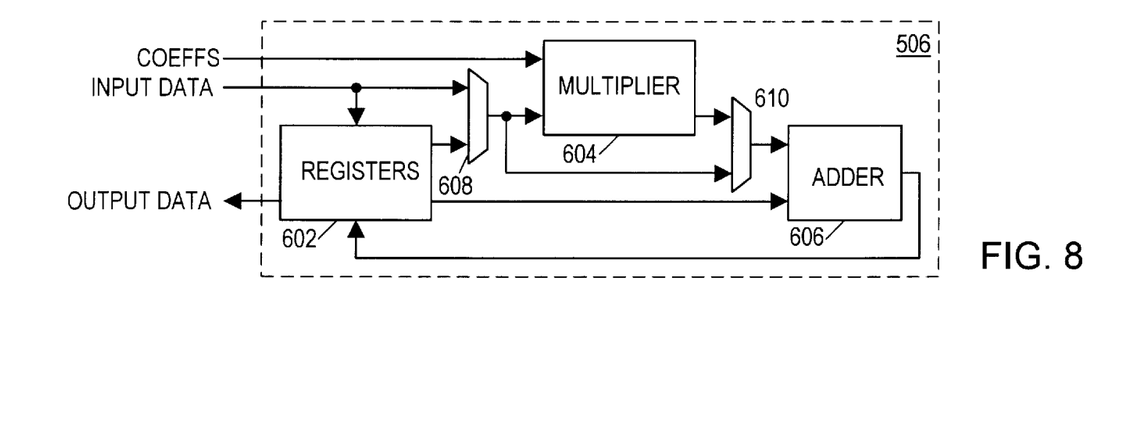
FIG. 8 shows a block diagram of a data path usable in an audio decoder.

FIG. 8 shows a functional block diagram of one embodiment of data path 506, which comprises registers 602, multiplier 604, adder 606, and multiplexers 608 and 610. Each of these components is provided with one or more control signals to latch inputs, to intiate operations, or to route signals. The control logic 508 implements a state machine for each of the transformation, downmixing, and windowing operations, and provides the control signals to the data path 506 in accordance with the state machines. Control logic 510 also controls interfaces 504 and 510 to route input data and output data to and from data path 506, and accesses coefficient memory 514 to provide multiplier coefficients to data path 506. Depending on the control signals, data path 506 scales, adds, and/or accumulates input values to produce output values. Registers 602 is a collection of registers for latching and storing input, output, and intermediate values. Input data is routed to registers 602 or multiplexer 608. Multiplexer 608 forwards either the input data value or a stored register value to multiplier 604. When triggered, multiplier 604 multiplies the forwarded value with a coefficient from control logic 508. A second multiplexer 610 forwards either the product or the forwarded value from the first multiplexer 608. When triggered, adder 606 adds a stored register value to the forwarded value from the second multiplexer 610, and stores the result in one of the registers 602. One of the registers in register 602 is an output register which latches in accordance with a control signal from control logic 508.

Data path 506 is a very flexible module capable of implementing a wide variety of algorithms. The algorithms and the order in which they are implemented is determined by control logic 508. A state diagram may be used to describe each algorithm which the control logic 508 implements, and a master state diagram may be used to provide selection and ordering of the individual algorithms.

Figure 9:
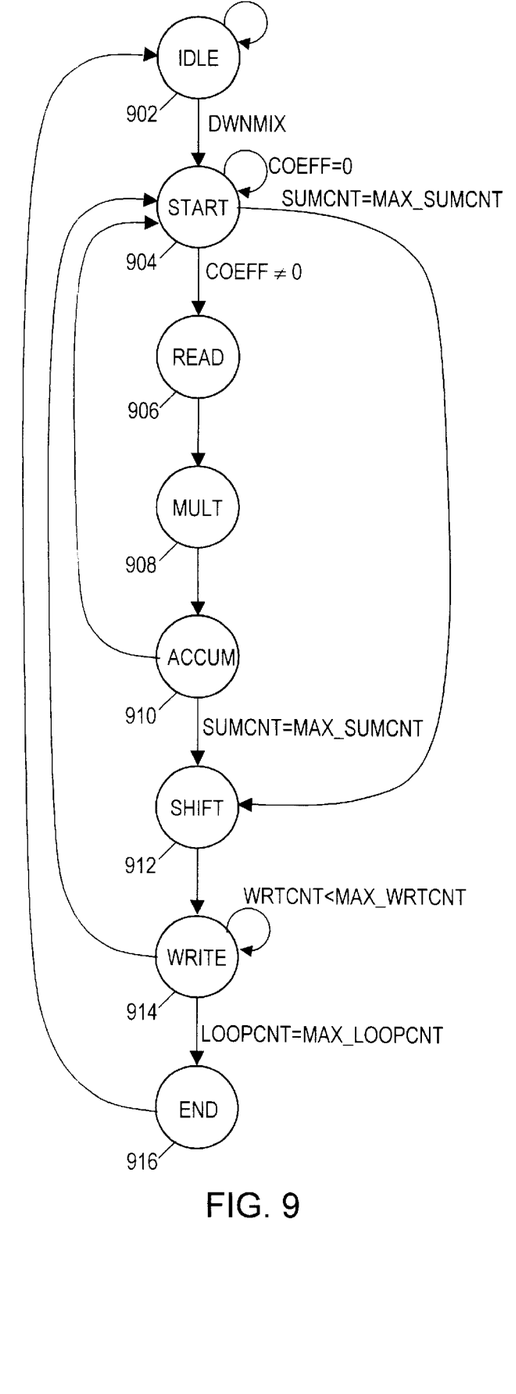
FIG. 9 shows a state diagram of a downmixing operation when the downmixing operation follows a windowing operation.

FIG. 9 shows a state diagram for the downmixing operation when it is implemented after windowing is completed for all the source channels. State 902 is an idle state where the control logic waits for a trigger signal to initiate the downmixing operation. When a block of windowed audio samples from all audio channels of one audio frame is available, a DOWNMIX signal is asserted, causing the control logic to change to state 904. State 904 performs a check on the downmix coefficient to determine if it is nonzero. If the coefficient equals zero, loop iterations for that channel are skipped. States 904, 906, 908, and 910 form a loop in which a sample is read (906) from a source channel, multiplied (908) by a downmix coefficient, and added (910) to a value in an accumulator. The final value in the accumulator is a downmixed sample for one output channel. After all source channels have contributed to the downmixed sample (i.e. after MAX_SUMCNT iterations), the accumulator value is shifted to an output register in state 912, and written to the appropriate output buffer in state 914. In some cases, the audio sample will be written to more than one output buffer. After state 914, control returns to state 904 so that the next downmix sample for the same output channel can be found. This process is repeated until the downmixing is done for all the samples of the current output channel (i.e. when LOOPCNT=MAX_LOOPCNT), and the control logic enters state 916. State 916 is an end state in which registers and flags are reset, after which control returns to the idle state 902. This process is repeated until all source channels in all the audio blocks have been decoded and reproduced as the desired number of output channels.

Figure 10:
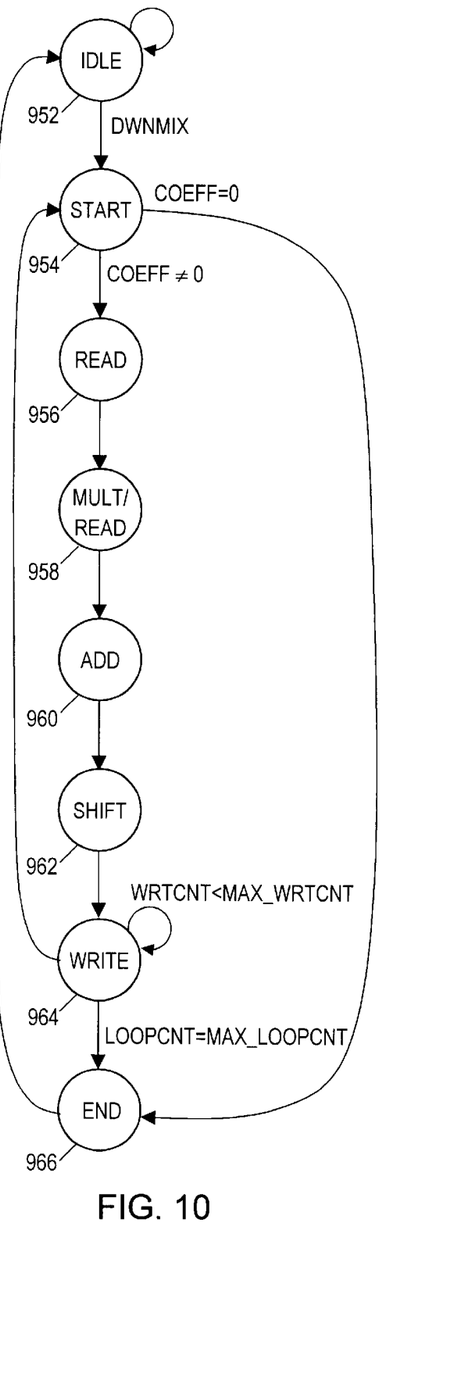
FIG. 10 shows a state diagram of a downmixing operation when the downmixing operation precedes a windowing operation.

FIG. 10 shows a state diagram for the downmixing operation when it is implemented before the windowing operation. State 952 is an idle state where the control logic waits for a trigger signal to initiate the downmixing operation. When a block of audio samples from a single channel of a single audio frame is available, a DOWNMIX signal is asserted, causing the control logic to change to state 954. State 954 performs a check to determine if the downmix coefficient for the current output channel is zero, and if so, it skips to the next output channel, i.e. skipping through state 965 to state 952, and incrementing a channel counter which indicates the number of downmixed source audio channels. For the current audio channel, the master state machine proceeds from downmixing to complete the windowing operation (only the windowing operation for the current audio channel). However, when the coefficient is nonzero, in state 956 the input audio sample is read, and in state 958, the input audio sample is multiplied by the downmix coefficient. At the same time, in state 958, a partial output channel value is read from the output buffer. In state 960, the contribution from the current input audio channel is added to the appropriate output channel value, and in state 962 the sum is shifted to an output register. In state 964, the sum is written back to the output buffer, and may additionally be written to other output buffers. Control returns to state 954, and the loop is repeated until the contribution of each of the input audio channel samples to all of the output channels has been calculated (i.e. until LOOPCNT=MAX_LOOPCNT). At this point, control is transferred to end state 966, in which registers and flags are reset, and then control returns to idle state 952.

Numerous variations and modifications will become apparent to those skilled in the art once the above disclosure is fully appreciated. It is intended that the following claims be interpreted to embrace all such variations and modifications.

What is claimed is:

1. An audio decoder which comprises:

a control module; and a data path configured to receive input audio samples, to scale audio samples, to add audio samples, and to produce output audio samples in accordance with control signals and coefficients from the control module, wherein the control module is configured to direct the data path to carry out a windowing operation and a downmixing operation, wherein in a first mode the control module is configured to conduct the downmixing operation before the windowing operation.

2. The audio decoder of claim 1, wherein in the first mode, the downmixing operation converts audio sample blocks for a first number of source channels into downmixed audio sample blocks for a second number of output channels, and the windowing operation for each output channel subsequently combines adjacent downmixed audio sample blocks to form windowed downmixed audio sample blocks, and wherein the windowed downmixed audio sample blocks are written to output channel buffers.

3. The audio decoder of claim 2, wherein the data path is coupled to an input buffer to retrieve an audio sample block for a current input channel, wherein the data path is coupled to an output memory to store intermediate results in output channel buffers, wherein during the downmixing operation the data path is configured to compute an input channel audio sample contribution to each output channel audio sample block, and further configured to add the input channel audio sample contribution to intermediate results stored in corresponding output channel buffers.

4. The audio decoder of claim 1, wherein in a second mode, the control module is configured to conduct the downmixing operation after the windowing operation.

5. The audio decoder of claim 4, wherein in the second mode, the data path reconstructs all source channels individually in a time domain before downmixing the source channels to a specified number of output channels.

6. The audio decoder of claim 4, wherein the control module directs the data path to carry out a standardized set of downmix equations to implement the downmixing operation for both the first and second modes.

7. The audio decoder of claim 4, wherein in the second mode, for each source channel the windowing operation combines adjacent audio sample blocks to form corresponding windowed audio sample blocks, and the downmixing operation subsequently converts windowed audio sample blocks for a first number of source channels to downmixed windowed audio sample blocks for a second number of output channels.

8. The audio decoder of claim 5, wherein the data path is coupled to an input memory to retrieve windowed audio sample blocks, and is further coupled to an output memory to provide downmixed windowed audio sample blocks as output channel audio sample blocks, wherein the data path is configured to multiply audio samples from the windowed audio sample blocks by downmix coefficients to determine contributions to each output channel, and wherein the data path is configured to add corresponding contributions for each output channel to produce the output channel audio sample blocks.

* * * * *